No. 888,702. PATENTED MAY 26, 1908.
F. H. FROST & W. A. REESE.
GRIPPING PULLEY.
APPLICATION FILED MAY 16, 1907.
2 SHEETS—SHEET 1.
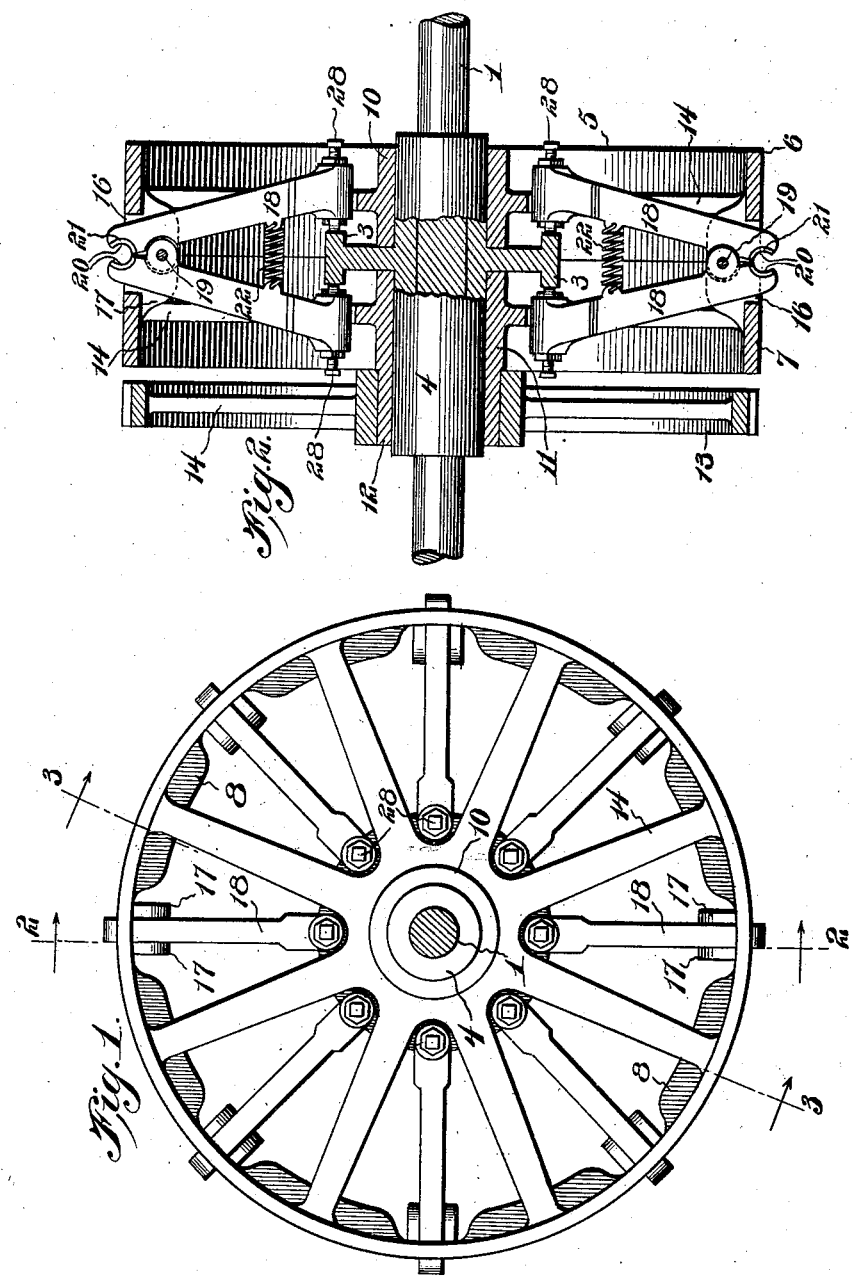
Witnesses
Louis R. Heinrichs
J W Garner
Inventors
Fred H. Frost
William A. Reese
By Victor J. Evans
Attorney No. 888,702. PATENTED MAY 26, 1908.
F. H. FROST & W. A. REESE.
GRIPPING PULLEY.
APPLICATION FILED MAY 16, 1907.
2 SHEETS—SHEET 2.
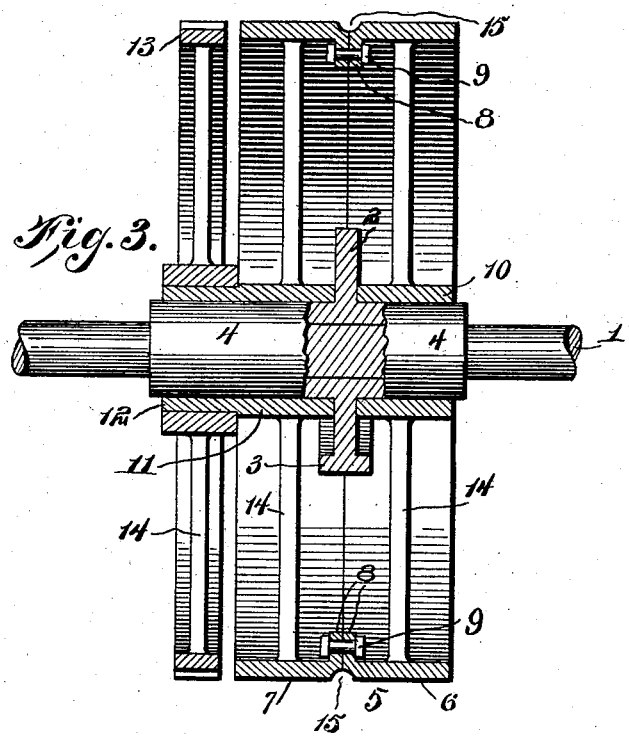
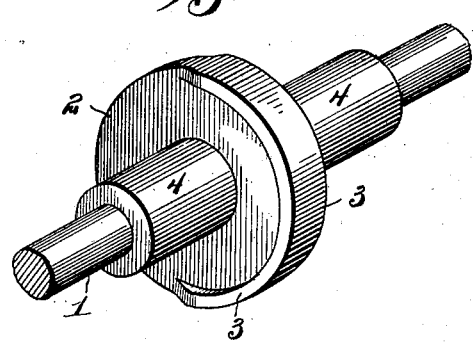
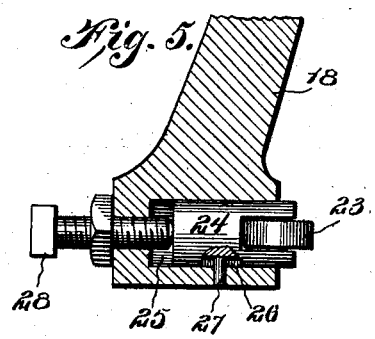
Inventor
Fred H. Frost
William A. Reese
Witnesses
Louis R. Heinrichs
J W Garner
By Victor J. Evans
Attorney

UNITED STATES PATENT OFFICE.

FRED H. FROST AND WILLIAM A. REESE, OF RICHWOOD, WEST VIRGINIA.

GRIPPING-PULLEY.

No. 888,702.  Specification of Letters Patent.  Patented May 26, 1908.

Application filed May 16, 1907. Serial No. 373,956.

*To all whom it may concern:*

Be it known that we, FRED H. FROST and WILLIAM A. REESE, citizens of the United States, residing at Richwood, in the county of Nicholas and State of West Virginia, have invented new and useful Improvements in Gripping-Pulleys, of which the following is a specification.

This invention is an improved gripping pulley for applying power to an endless cable to operate the same for use in moving loads from one point to another, or transmitting power and for other similar purposes, and it consists in the construction, combination and arrangement of devices hereinafter described and claimed.

The object of our invention is to provide a pulley for imparting motion to an endless cable, which pulley is provided with automatically acting gripping means for gripping the cable on one side of the pulley as the latter revolves and releasing the cable at the opposite side of the pulley, so that the cable is prevented from slipping on the pulley.

In the accompanying drawings: Figure 1 is a side elevation of a gripping pulley embodying our invention, the axle on which the same is mounted being indicated in cross section, Fig. 2 is a transverse sectional view of the same, taken on the plane indicated by the line 2—2 of Fig. 1, Fig. 3 is a similar view of the same, taken on the plane indicated by the line 3—3 of Fig. 1, Fig. 4 is a detail perspective view of the axle and of the cam thereon, and Fig. 5 is a detail sectional view of the inner end of one of the cable gripping arms or jaws.

The axle 1 is, in practice, supported on suitable bearings and is fixed thereto, so that said axle is non-revoluble. On the axle is a fixed non-revoluble circular cam 2, which is provided on opposite sides with segmental laterally projecting peripheral cam flanges 3. Said cam may be formed integral with or separately from the axle, and if formed separately from the axle may be secured thereto by any suitable means. The cam is here shown as provided on opposite sides with cylindrical portions 4, which are concentric with the axle and in effect form enlargements thereof to furnish bearings for the hub members of the pulley.

The pulley 5 comprises a pair of members 6—7, which are formed at their opposing sides with segmental lugs or flanges 8, which extend inwardly from their rims and are bolted together, as at 9, to firmly secure said pulley members together. The pulley member 6 has a hub 10. The member 7 has a hub 11 provided at its outer end with an extension 12 on which is keyed, or otherwise suitably secured, a drive wheel 13, which is here shown as provided with peripheral spurs or cogs. Each pulley member is provided with radial spokes 14. The pulley is provided with a peripheral substantially semi-circular groove 15 at the point where its members meet for the reception of the cable, which cable is not here shown.

At suitable points between the spokes the rim of the pulley is provided with openings 16. At the sides of the said openings are transversely disposed lugs or flanges 17, which extend inwardly radially from the rim of the pulley. Also disposed between the spokes of the pulley are radially disposed pairs of gripping arms 18. Said gripping arms are pivotally mounted in pairs, as at 19, between the pairs of flanges or lugs 17, the outer ends of said pairs of gripping jaws, projecting outwardly through the openings 16 in the periphery or rim of the pulley. The extreme outer ends of the gripping arms are recessed, as at 20, to receive the cable, the recesses of said gripping arms being coextensive with the cable-receiving groove 15 of the pulley. Said recesses are preferably lined with suitable material 21 to prevent the outer ends of the gripping arms from wearing and to also enable the said arms to be firmly gripped on the cable. The members of each pair of gripping arms are connected together by a spring 22, the function of which is to draw the inner ends of the gripping arms normally toward each other, so as to open their outer ends to enable them to release the cable. The inner ends of the gripping arms are disposed on opposite sides of the cam 2, and said inner ends of the gripping arms are provided with tappet devices 23, for engagement with the cam flanges 3. The said tappet devices are here shown as anti-friction rollers journaled in cylindrical blocks 24, which are movable laterally with respect to the arms 18 in cylindrical recesses 25 with which said arms are provided. Said blocks are provided with longitudinal slots 26, for the reception of studs 27, which prevent them from turning while enabling them to be longitudinally adjusted in order to cause the tappet rollers 23 to be disposed in such position with respect to the cam 2 as to insure their coming in contact with the cam segments 3. Screws 28 are here shown for adjusting said blocks and hence such tappet rollers.

It will be understood that the segment cam flanges 3 are on the side of the cam which is nearest the bight of the cable. Since such cam is non-revoluble and the pulley rotates, it will be understood that as each pair of gripping arms approach the bight of the cable on one side of the pulley their inner ends will be moved apart by the action of the cam segments 3 and the tappet devices 23, so that their outer ends will be caused to firmly grip the cable and prevent the latter from slipping on the pulley. It will also be understood that as each pair of gripping arms recedes from the bight of the cable, their inner ends will come opposite that portion of the cam 2, which is unprovided with cam segments 3, and hence the springs 22 will draw the inner ends of such gripping arms toward each other, as their tappet devices clear the cam segments and the outer ends of such gripping arms will be opened and will disengage the cable.

Having thus described the invention what is claimed as new, is:—

1. In combination with a fixed cam having segment cam flanges on opposite sides, a pulley mounted for rotation having openings in its rim and lugs on the inner side of its rim, pairs of radially disposed gripping arms pivotally connected to the said lugs having their outer ends extended through said openings and provided at their inner ends with tappet devices bearing on opposite sides of such cam, and springs to move the inner ends of such gripping arms toward each other.

2. In combination with a fixed cam having segment cam flanges, a pulley mounted for rotation, cable gripping jaws or arms carried by said pulley and provided at their inner ends with recesses, blocks movable in such recesses, anti-friction tappet rollers carried by such blocks, and means to adjust such blocks and rollers to cause the latter to coact with such cam flanges and operate such cable gripping jaws.

In testimony whereof, we affix our signatures in presence of two witnesses.

FRED H. FROST.
WILLIAM A. REESE.

Witnesses:
LEROY CROPP,
T. LLOYD FALOR.